APPARATUS AND METHOD FOR EVAPORATING FILMS
IN CERTAIN TYPES OF ELECTRICAL COMPONENTS

Filed Feb. 23, 1955 4 Sheets-Sheet 1

INVENTOR.
JACOB RISEMAN
DOROTHY M. HOFFMAN
BENJAMIN SOLOW
BY Donald S. Cohen
ATTORNEY INVENTOR.
JACOB RISEMAN
DOROTHY M. HOFFMAN
BENJAMIN SOLOW
BY Donald S. Cohen
ATTORNEY INVENTOR.
JACOB RISEMAN
DOROTHY M. HOFFMAN
BENJAMIN SOLOW
BY Donald S Cohen
ATTORNEY INVENTOR.
JACOB RISEMAN
DOROTHY M. HOFFMAN
BENJAMIN SOLOW
BY Donald S. Cohen
ATTORNEY United States Patent Office 2,847,325
Patented Aug. 12, 1958

2,847,325

APPARATUS AND METHOD FOR EVAPORATING FILMS IN CERTAIN TYPES OF ELECTRICAL COMPONENTS

Jacob Riseman, Dorothy M. Hoffman, and Benjamin Solow, Philadelphia, Pa., assignors to International Resistance Company, Philadelphia, Pa.

Application February 23, 1955, Serial No. 490,006

23 Claims. (Cl. 117—107)

This invention relates to an apparatus and method for evaporating films on certain types of electrical components. More particularly it relates to the apparatus and method of evaporating metal films on electrical resistors.

It has been previously proposed to make metal film electrical resistors by coating a base member of an insulating material with a metal by evaporating the metal in a vacuum and condensing the metal vapors on the base member. However, the apparatus previously used to carry out this method is not suitable for commercial manufacture of resistors. This is due to the fact that the apparatus is not adapted to make large quantities at one time, especially when the base members are cylindrical rods. More particularly, the apparatus was not adapted to coat large quantities of cylindrical base members at one time to provide a uniform coating over the entire surface of each base member as well as uniform coatings on all the base members so that all the resistors in each batch made would have substantially the same resistance value.

It has also been proposed to form a termination for the resistance film by evaporating a highly conducting metal laryer on the ends of the base member which overlaps or overlays the resistance film. This is accomplished by masking the central portion of the resistance film and evaporating the terminating films on the uncovered portion. However, this method was disadvantageous in that the resistance films were exposed to air and some metals which are very good for terminating, such as silver, do not adhere well to the previously evaporated resistance film once the resistance film is so exposed.

It is therefore an object of this invention to provide an apparatus for making a large quantity of metal film resistors at one time. Another object is to provide an apparatus for making a large quantity of metal film resistors having uniform coatings. Still another object is to provide an apparatus for evaporating a metal film on a cylindrical base member which provides a uniform coating over the entire surface of the base member. A further object is to provide a method of terminating a resistor with a strongly adherent metal film. A still further object is to provide a method of thermally evaporating in a vacuum a metal film termination on a resistor. Another object of this invention is to provide a method of the above character for mass producing resistors of the metal film type. Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which.

Electrically conducting metals or alloys in bulk have for the most part a positive temperature coefficient of resistance, i. e., the resistance increases with an increasing temperature. However, in very thin films these metals or alloys apparently act as semi-conductors having negative temperature coefficient of resistance, i. e., the resistance decreases with increasing temperature. In a region of film thickness between the bulk form and the very thin films the temperature coefficient changes from positive to negative. This region is called the "cross-over" region and the exact thicknesses in this region varies with each metal or alloy. Metal film resistors having a film thickness in this region will have very small positive or negative temperature coefficients or possibly even a zero temperature coefficient. Such a film provides a resistor which is very stable with respect to changes in temperature. Thus, resistors can be tailor made to obtain a desired temperature coefficient for a desired resistance value. However, to make such resistors, a method and apparatus must be used which can provide a fine control of the thickness of the metal film formed and thermal evaporation of the metal in a vacuum is suitable for this purpose.

Figure 1:
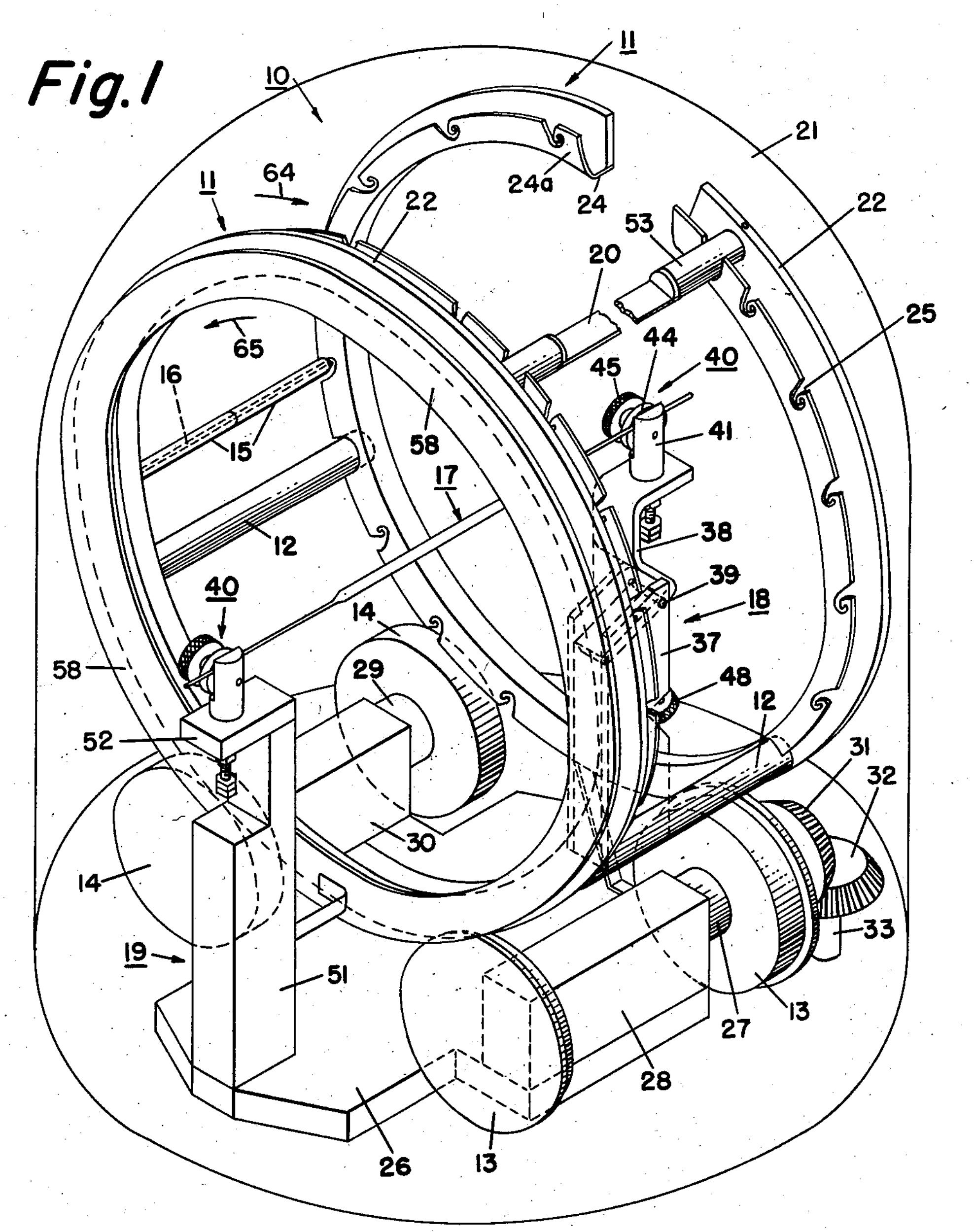
Figure 1 is a perspective view of the apparatus of this invention.

Referring to Figure 1 of the drawing, the contemplated apparatus, suitable for commercial manufacture of such resistors and providing a fine control of the metal film being formed, includes a cage 10 supported on two pairs of wheels 13—13 and 14—14 for rotation. A plurality of cylindrical members 15 on which the metal is to be deposited are mounted on supports 16 of the cage. The cylindrical members 15 are preferably fixed to the supports 16 and do not rotate relative thereto but the supports 16 are rotatable relative to cage 10. Accordingly, as cage 10 rotates each support 16 rotates about its own axis through the same angle as the cage, much in the manner of a Ferris wheel. An evaporating filament 17 containing the metal to be evaporated is connected across a source of electric current and is suitably supported near the axis of the cage. A resistance indicating plate 20 is connected between the sides of the cage 10 and is connected to an electrical resistance measuring device so that the resistance across the plate 20 can be continuously measured.

In use the cage 10 is enclosed in a bell jar 21 which is evacuated to a pressure suitable for thermal evaporation. The wheel is then rotated and the evaporating filament 17 is heated to the evaporation temperature of the metal coated thereon. The metal vapors flow away from the filament 17 in all directions and upon contacting the colder cylindrical members 15 and indicator plate 20 will condense thereon to form a film of the metal. Since the cylindrical members rotate with respect to the sides of the cage and at the same angular speed all points on the surface of the cylindrical members 15 will be evenly exposed to the filament 17. Thus metal films will be provided completely around the surfaces of each cylindrical member. When a film of the desired thickness is formed on the cylindrical members 15, as indicated by the resistance of the film formed on indicator plate 20, the current to the filament 17 is turned off. The vacuum in the chamber is then broken and the cylindrical members are ready for further processing, such as terminating, thereby to be made into completed resistors. After masking, evaporation of terminating coatings can be carried out in a manner as will be described.

Figure 2:
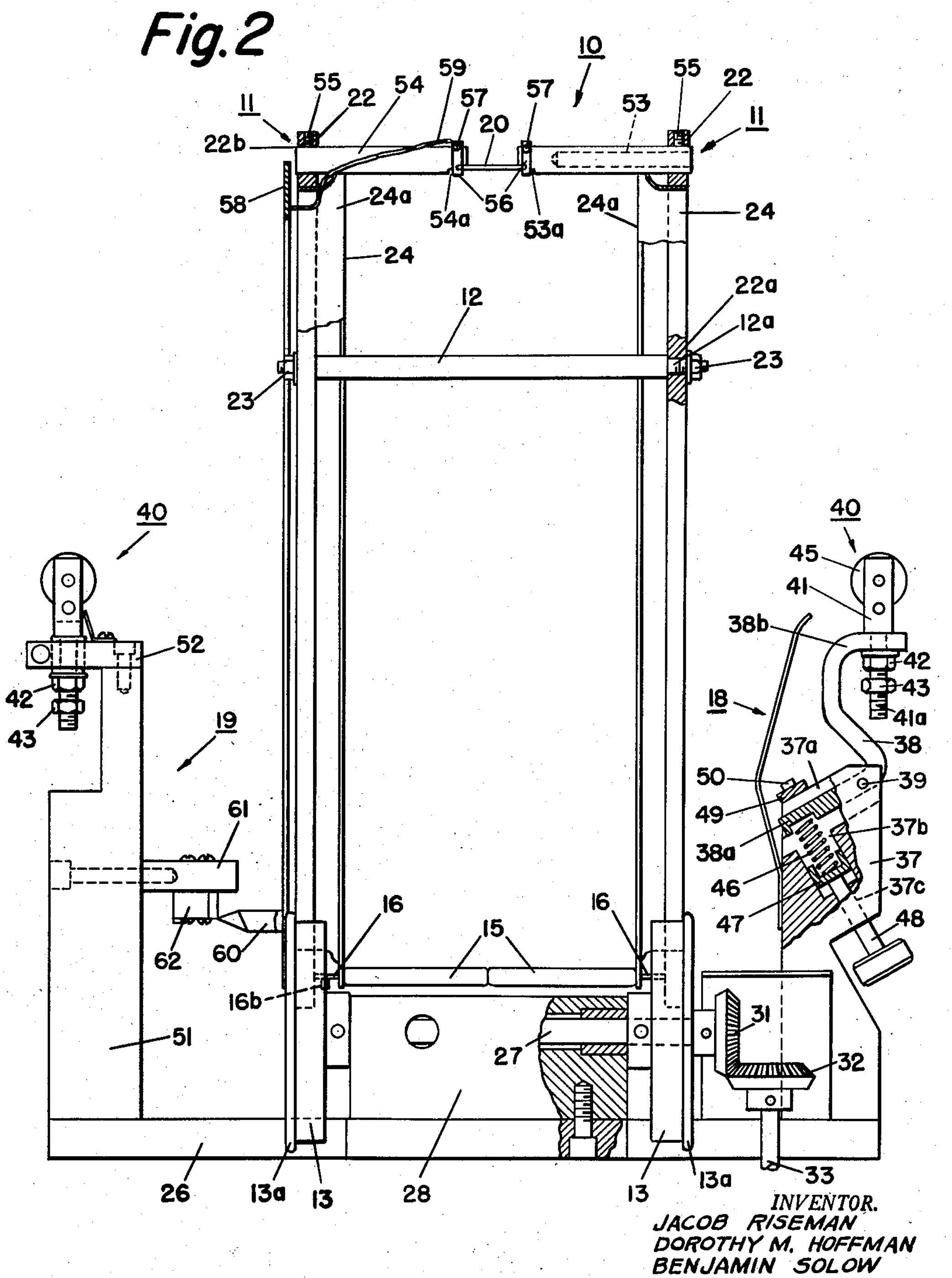
Figure 2 is an end view of the apparatus partially broken away.
Figure 3:
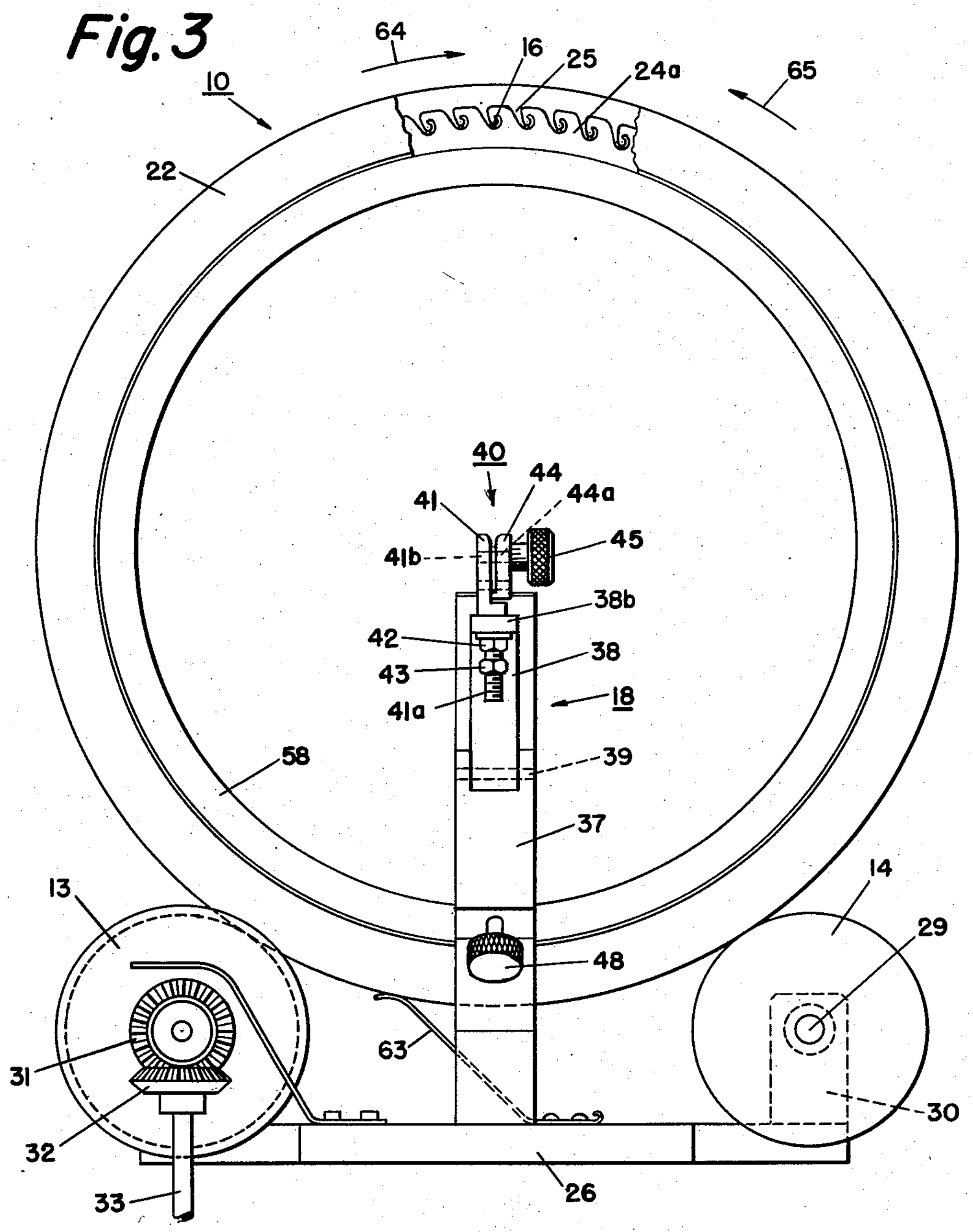
Figure 3 is a side view of the apparatus partially broken away.

Now referring in detail to Figures 1, 2 and 3 of the drawing, the apparatus comprises a cage 10 made up of two similar annular sides generally indicated as 11 connected together in spaced parallel relation. Each side 11 includes an annular metal rim 22 and rims 22 are secured together by rigid rods 12 spaced around the rims. Rods 12 have threaded reduced end portions 12*a* fitting in holes 22*a* (Figure 2) of rims 22, the parts being held in assembled relation by nuts 23. Sides 11 each include cylindrical rings 24 secured to rims 22 and include extending flanges 24*a*, substantially parallel to rims 22. Each flange 24*a* has a plurality of oppositely disposed substantially spiral slots 25 regularly spaced thereabout; slots 25 are spiralled in the same direction. The cage 10 is supported on base plate 26 by two pairs of wheels 13—13 and 14—14, mounted in spaced parallel relation respectively on shafts 27 and 29 which are rotatably mounted in bearings 28 and 30 on base plate 26. Wheels 13 and 14 are in registry with rims 22 and therefore cage 10 rests on the wheels. A bevelled gear 31 secured to shaft 27 meshes with drive gear 32 on shaft 33 driven in any convenient manner such as a motor (not shown), preferably reversible. When wheels 13 are driven the cage 10 rotates through the frictional engagement with the wheels 13; flanges 13*a* on the outer edge of the wheels engage rims 22 to prevent displacement of the cage.

Figure 7:
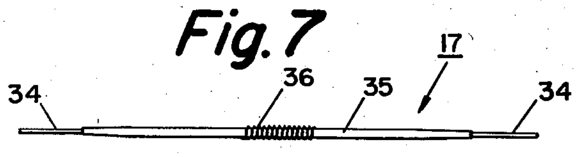
Figure 7 is an elevation of the evaporating filament.

An evaporating filament 17 of the coating metal is mounted between filament supports 18 and 19 so that it extends between the sides 11 of cage 10 and substantially along the axis thereof. Referring to Figure 7 the filament comprises one or more heating wires 34 having a vaporizing temperature much higher than that of the coating metal, e. g. tungsten or molybdenum. The heater wire 34 may be covered with the coating metal 35. In fact, this is conventional evaporation filament structure previously used for coating by thermal evaporation. However, in using such a filament the portion of the cylindrical members 15 midway between the sides 11 of cage 10 obtain a thicker layer of the metal 35 than the portions thereof near the sides 11 and it is desirable that the coating be uniform from end to end. To this end a wire 36 of the same material as heater wire 34 is helically wound on the central portion of the wire 34 prior to covering with metal 35. Thus when the heater wire 34 is heated to evaporate metal 35, the central portion which is covered by the additional wire 36 will be cooler than the rest of the wire 34 so that a smaller amount of metal 35 will be evaporated therefrom. Thus, the amount of metal vapors contacting and condensing on members 15 can be made uniform along the entire length of the members by determining the length of wire 35. This length varies with the distance between sides 11, filament 17 and the members 15. The proper length for the size of the cage used can be determined empirically.

Referring to Figure 2 the filament support 18 comprises a post 37 mounted on the base plate 26 adjacent one side of the cage 10. The post 37 has a slot 37*a* across its top surface which is angled upwardly and away from cage 10 and a hole 37*b* extending from the bottom of the slot 37*a*. The hole 37*b* does not extend completely through the post 37 and a smaller threaded hole 37*c* extends from the bottom of the hole 37*b* to the side of the post 37. A substantially S-shaped arm 38 has its bottom leg 38*a* fitting in the slot 37*a* and is pivotally supported therein by a pin 39 extending through the sides of the slot 37*a*. A clamp 40 is mounted on the top leg 38*b* of the arm 38 and as seen in Figure 3 the clamp 40 comprises a clamp bracket 41 resting on the top surface of top leg 38*b* and having a terminal post 41*a* extending through the top leg. A nut 42 is threaded on the terminal post 41*a* and engages top leg 38*b* to secure the clamp bracket 41 to the leg. A clamping plate 44 disposed adjacent bracket 41 is supported by thumb screw 45 extending through hole 44*a* therein and is threadably received in a hole 41*b* in the clamping bracket 41.

Returning to Figure 2, spring 46 in hole 37*b* is compressed between the bottom leg 38*a* and cup 47. A thumb screw 48 threaded in hole 37*c* engages the bottom of the cup to vary the compression of the spring 46. The spring 46 urges the bottom leg 38*a* upwardly so that the clamp 40 is urged away from cage 10 or in a clockwise direction as viewed in Figure 2. A stop 49 extends across the top of the slot 37*a* and is secured to the post 37 by bolt 50 so as to limit the upward movement of leg 38*a*. Filament support 19 (Figure 2) comprises a post 51 mounted on base 26 opposite the other side of cage 10. A ledge 52 extends from the top of post 51 and clamp 40 preferably similar to the clamp on support 18 is mounted thereon. Clamps 40 are electrical conductors to conduct current to the filament 17. Wires are clamped between nuts 42 and 43 of each clamp and in turn are connected across a source of electricity for filament 17.

Cylindrical members 15 mounted between the sides 11 of the cage on supports 16 for coating are formed from insulating material such as glass or ceramic. Supports 16 are preferably formed from stiff mounting wire longer than the distance between the flanges 24*a* but shorter than the distance between the annular rims 22 and a weight 16*b* is attached to one end thereof; the greatest mass of weight 16*b* is on the lower side thereof. The mounting wires 16 in cylindrical members 15 are proportioned for friction fits to prevent relative movement therebetween as by proportioning the diameter of wire 16 and the inner diameter of member 15.

Supports 16 are mounted between the sides 11 of the cage 10 by placing the ends of the mounting wire in a pair of opposed spiral slots 25 with the weight 16*b* disposed between the flange 24*a* and annular rim 22 of one side 11. Referring to Figures 3 to 6 each of the slots 25 comprises a substantially radial edge 25*a* extending from the outer edge of flange 24*a* to a curved bottom portion 25*b* and an arcuate portion 25*c* extending from the bottom portion 25*b* and curving back toward the radial portion 25*a*. The arcuate portion 25*c* etxends approximately 180° to overlap bottom portion 25*b*. The sides of the radial portion 25*a* are tapered to widen the mouth of each slot thereby allowing for easy insertion and removal of mounting wires 16. The net effect is the formation of a series of spiral or hook-shaped slots for supporting mounting wires on the cage during deposition and automatic removal therefrom as will be presently described.

As seen in Figure 2, the resistance indicator plate 20 is supported between a pair of rods 53 and 54 which extend horizontally from the sides 11 of the cage. Each rod is mounted in a hole 22*b* formed in an annular rim 22 and is locked therein by a set screw 55. Rod 53 is of an electrical conductor while the other rod 54 is an insulator. The opposed end portions 53*a* and 54*a* of rods 53 and 54 are flat and a spring clip 56 is secured to each by screws 57. The indicator plate 20, formed from insulating material, such as glass or ceramic, has a metal conductive band coated at each end. Such ends being clamped in place by spring clips 56 engaging the coatings. An annular collector ring 58 is secured to and insulated from the outer side of the rim 22 connected to rod 54; collector ring 58 is connected by wire 59 to clip 56 on rod 54. A spring contact 60 slidably engages collector ring 58 and is connected to an insulation block 62 mounted on a ledge 61 extending from filament supporting post 51. A second spring contact 63 (see Figure 3) mounted on the base plate 26 slidably contacts the outer surface of the annular rim 22 secured to conducting rod 53. Each of the spring contacts 60 and 63 are wired to terminals (not shown) extending through the base plate 26 which are in turn connected across a resistance meter. Thus the resistance across the indicator plate 20 can be continuously measured while the cage 10 is rotating.

As seen in Figure 1, a bell jar 21 or the like, is placed over the cage 10 and associated mechanism to form a sealed chamber containing the apparatus. A vacuum pump (not shown) is connected to the sealed chamber in any suitable manner such as through a hole through the base plate 26 to evacuate the chamber.

Figure 4:
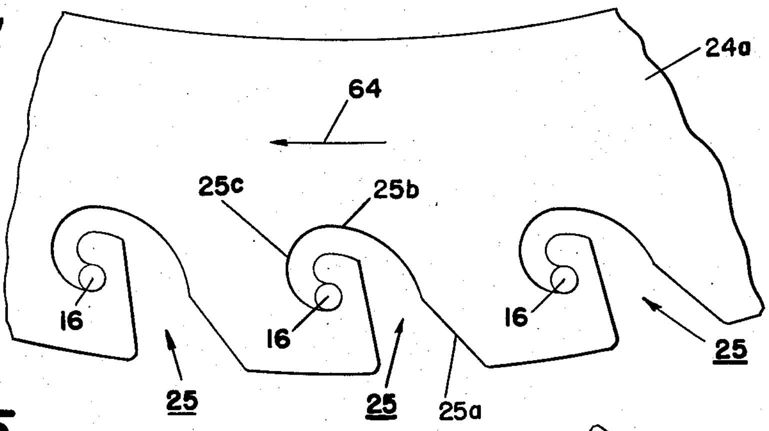
Figure 4 is a fragmentary view of a part of the bottom portion of the supporting cage as it rotates in operation.
Figures 5, 6:
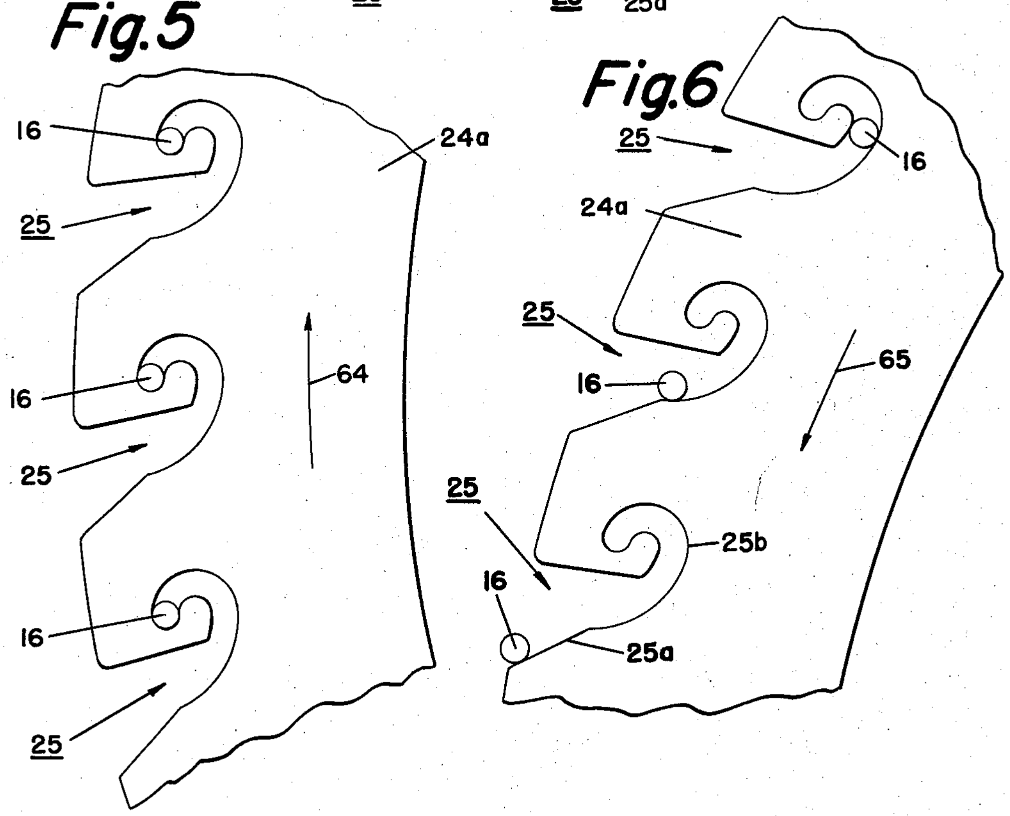
Figure 5 is another fragmentary view of a part of the side portion of the cage as it rotates in operation.
Figure 6 is still another fragmentary view of a part of the cage as it rotates for unloading.

To use the apparatus, one or more cylindrical members 15 are mounted on each wire 16 which are then mounted on the cage 10 with the ends of the wire disposed in opposed slots 25. Preferably the wires 16 are first placed in the slots at the top of the cage. The cage 10 is then rotated in the direction of arrow 64 or clockwise as viewed in Figure 1 to bring empty slots 25 to the top. As can be seen in Figure 3, the wires 16 when inserted in a slot 25 at the top of the cage rest on the bottom portion **25*b* of each slot. As the cage rotates in the direction of arrow 64 such slot 25 starts to descend and the wire 16 slides into the arcuate portion 25*c*. When a slot 25 is at the bottom as shown in Figure 4, wire 16 is at the closed end of the slot. As the cage 10 rotates further and the slot 25 begins to rise toward the top of the cage the wire 16 is carried along by the closed end of the slot as shown in Figure 5. When the slot 25 again reaches the top of cage 10 the wire slides out of the arcuate portion 25*c* back into the bottom portion 25*b*. Thus the wire 16 is maintained in the slot 25 throughout the complete rotation of the cage 10. The indicator plate 20 is then mounted on rods 53 and 54 as previously described. An evaporating filament 17 is mounted on supports 18 and 19 as previously described. The spring 46 (Figure 2) urges the clamp 40 on the S-shaped arm 38 to maintain the filament 17 taut at all times. The bell jar 21 is then placed over the cage 10 to enclose the apparatus in a sealed chamber and the chamber is evacuated to a pressure suitable for thermal evaporation usually about 0.5 microns. Drive wheels 13 are turned on to rotate the cage about the filament 17 in the direction of arrow 64 and current to evaporating filament 17 is turned on to heat the filament wire 34 to the evaporating temperature. When the metal 35 evaporates the vapors diffuse in all directions from the filament 17 toward the cylindrical members 15 rotating therearound. Since the cylindrical members 15** shadow the path of the vapors, some of the vapors will contact the cylindrical members and condense thereon to form a film.

Since the cylindrical members 15 rotate in a circle around the filament 17 during each revolution of the cage 10 each member 15 travels along identical paths and is exposed to the metal vapors diffusing from the filament in identical fashion. Therefore, the metal film on each member is uniform providing resistor units having substantially identical resistance values. The weights **16*b* on each wire 16 have their centers of gravity offset from the axes of the wires 16, and, as previously described, depend vertically. As the cage 10 rotates with the weights always so hanging the wire 16 and the cylindrical members 15, fixedly mounted thereon, rotate with respect to the sides 11** of the cage. This maintains the cylindrical members in a substantially fixed position, in the same manner as the various carriages of a Ferris wheel.

When the cylindrical members are coated sufficiently to provide a film having the desired resistance value, as indicated by the indicator plate 20, the current to the filament 17 is turned off. If desired, the device measuring the resistance of the film on the indicator plate 20 may automatically turn off the current to the filament 17 when the desired resistance value is reached. The rotation of the cage 10 is then stopped and air admitted to the bell jar 21. The bell jar 21 is then removed and the coated cylindrical members 15 are unloaded from the cage 10 by reversing the rotation thereof as indicated by arrow 65. As shown in Figure 6, the wires 16 will slide from the bottom portion **25*b* of the slots 25 into the radial portion 25*a* and then drop out of the slots as they rotate toward the bottom of the cage. A container may be placed under the cage 10 to catch the wires 16 and cylindrical members 15 as they fall from the cage. Thus one complete revolution of the cage will unload the members 15 so that the cage 10** is ready to be reloaded for the next run.

By the use of this apparatus a large batch of metal film resistors may be made all having uniform coatings so as to provide units having substantially the same resistance value and each unit having a uniform coating around its circumference and along its length. The units thus coated are then ready for further processing i. e., application of terminals and protective coverings, etc.

In order to terminate the coated resistance units, it is necessary to apply a coating of a conductive material over the ends of cylindrical members 15 which terminating coating overlaps the metal film. It is desirable to apply this terminating coating by evaporating a conductive metal onto the units for such evaporated coating makes much better contact with the resistance film than coatings applied by other methods. Previously, the terminating coating was applied by masking the central portion of the resistance film and then placing such units back into the sealed chamber where a conductive metal coating was evaporated on the unmasked end portions of the unit. However, it was found that some conductive metals, such as silver, which provide good terminating coatings do not adhere well to the resistance film once the resistance film has been exposed to the air. In order to provide a termination coating of such metals with good adherence to the resistance film, the following method has been devised.

The central portions of the metal film resistance units are masked as by cylindrical sleeves leaving the end portions of the film exposed. The masked units are mounted in evaporating apparatus such as described above but having two separate evaporating filaments like filament 17. One of these filaments has thereon the terminating metal. The other filament has thereon a metal which although not a good terminating material will adhere well to the resistance film and the terminating metal. In many cases this metal may be the same as the resistance film. The chamber is then evacuated and the evaporation started. First the metal which will adhere to the resistance film is evaporated until the exposed portions of the resistance units are coated with a film thereof. Then, without breaking the vacuum within the chamber, the terminating metal is evaporated and coated onto the exposed portions of the resistance units. If desired, the terminating metal may be evaporated along with the intermediate metal for awhile prior to stopping the intermediate metal. Since a heavy film of the terminating metal is desirable, it is not necessary to provide a fine control on the thickness or uniformity of the coating. Thus, a terminating metal which will not adhere well to the resistance film when using previous methods is made to adhere well to the freshly evaporated intermediate film before exposure to air to provide a strongly bonded termination.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Apparatus for use in coating cylindrical members by thermal evaporation in a vacuum comprising in combination, a rotatable support, means for rotatably mounting said cylindrical members on said support a substantially equal distance from and parallel to the axis of said support, a coated filament, means for mounting said coated filament substantially along the axis of said support, and means for heating said filament to evaporate the coating therefrom.

2. Apparatus for use in coating cylindrical members by thermal evaporation in a vacuum comprising in combination, a rotatable support, means for mounting thereon cylindrical members equi-distant from and parallel to the axis of said rotatable support, said mounting means being rotatable with respect to said support but not rotatable with respect to said cylindrical members, a coated filament, means for mounting said coated filament substantially along the axis of rotation of said rotatable support, and means for heating said filament to evaporate said coating.

3. Apparatus for use in coating hollow cylindrical members by thermal evaporation in a vacuum comprising in combination, a rotatable support, a plurality of wires each passing through the hollow portion of one or more of said cylindrical members and mounted members on said rotatable support equi-distant from and parallel to the axis of rotation of said support, said cylindrical members being non-rotatable with respect to said wires but said wires being rotatable with respect to said support, means for rotating said wires with respect to said support, a coated filament, means for mounting said coated filament along the axis of rotation of said support, and means for heating said filament to evaporate its coating.

4. Apparatus for use in coating cylindrical members by thermal evaporation in a vacuum comprising the combination of a rotatable cage formed by two similar annular sides connected together in spaced parallel relation, means for mounting cylindrical members parallel to the axis and around the periphery of said cage between the sides thereof whereby said cylindrical members are rotatable with respect to said cage, means for rotating said cylindrical members with respect to said sides as said cage rotates, a coated filament, means for mounting said coated filament along the axis of rotation of said cage, and means for heating said filament to evaporate the coating therefrom.

5. Apparatus for use in coating cylindrical members by thermal evaporation in a vacuum comprising the combination of a rotatable cage formed by two similar annular sides connected together in spaced parallel relation, a plurality of hook-shaped slots in and extending from the outer edge of each of said sides and spaced around the circumference thereof, the slots in one of said sides being in opposed relation with the slots in the other of said sides to form a plurality of mating pairs, a plurality of cylindrical member supporting rods extending between said sides and having their ends freely supported in the slots, means for rotating said rods with respect to said sides as said cage rotates, a coated filament, means for mounting said coated filament on the axis of rotation of said cage, and means for heating said filament to evaporate the coating therefrom.

6. The combination as set forth in claim 5 in which the means for rotating said rods with respect to said sides comprises a weight rigidly secured to each rod with the center of gravity of said weights being offset from the axes of said rods.

7. Apparatus for use in coating cylindrical members by thermal evaporation in a vacuum comprising the combination of a cage formed by two similar annular sides connected together in spaced parallel relation, a base member, means on the base member for supporting and rotating said cage, means for mounting the cylindrical members parallel to the axis and around the periphery of said cage between the sides thereof whereby said cylindrical members are rotatable with respect to said cage, means for rotating said cylindrical member with respect to said sides as said cage rotates, a coated filament, means for mounting said coated filament to bridge said sides and on the axis of rotation of said cage, and means for heating said filament to evaporate the coating therefrom so that upon completion of a revolution of said cage all portions of the cylindrical surfaces of said members have been equally exposed to the vapors emanating from said filament.

8. The apparatus as set forth in claim 7 in which the means for supporting and rotating said cage comprises a pair of shafts rotatably supported on the base member in spaced parallel relation, a pair of wheels mounted on each shaft with the wheels on one shaft being in alignment with the wheels on the other shaft, and means for rotating one of the shafts.

9. The apparatus as set forth in claim 7 in which the means for mounting the coated filament comprises a vertical post mounted on the base member on each side of the wheel and a clamp secured to the top of each post.

10. The apparatus as set forth in claim 9 including means for pivotally mounting one of the clamps on its post.

11. The apparatus as set forth in claim 10 in which the means for pivotally mounting the clamp on the post comprises an S-shaped member having the clamp mounted on its top arm, its bottom arm pivotally connected to the post and a spring between the bottom arm and the post urging the clamp away from the cage.

12. The apparatus as set forth in claim 9 in which the clamps are made of an electrically conducting material and are each electrically connected to terminals extending through the base member.

13. Apparatus for use in making electrical resistors by coating cylindrical core members of an insulating material with a resistance material by thermal evaporation of the resistance material in a vacuum comprising the combination of a base member, a pair of shafts rotatably supported on the base member in spaced parallel relation, a pair of wheels mounted on each shaft with the wheels on one shaft being in alignment with the wheels on the other shaft, means for rotating one of the shafts, a pair of similar annular rims secured together in spaced parallel relation, the rims being supported by the wheels with each rim resting on and being in frictional engagement with a pair of the aligned wheels so that rotation of said one shaft will cause rotation of the rims, a coated filament, means for mounting said filament so that it extends between the rims and along the axis of rotation thereof, means for heating said filament to evaporate the coating therefrom, means for mounting the core members between said rims parallel to the axis and around the periphery thereof whereby said core members are rotatable with respect to said rims and means for rotating said core members with respect to said rims as said rims rotate.

14. The apparatus as set forth in claim 13 in which the means for mounting the core members comprises a pair of annular rings each secured to the inner circumference of a rim and extending toward the other rim and having a radially outwardly extending flange, a plurality of substantially spiral slots in and around the circumference of each of said flanges and extending from the outer edge thereof, the slots in one of said flanges being in directly opposed relation to the slots in the other of said flanges to form mating pairs of slots, a plurality of core member supporting rods extending between the annular rims and having their ends freely supported in the slots, and a weight rigidly secured to each supporting rod with the center of gravity of the weight offset from the axis of the rod so that as the annular rims rotate the weights will hang vertically downward throughout the complete revolution of the rims.

15. The apparatus as set forth in claim 13 in which the coated filament comprises a filament wire of an electrically conducting material having an evaporating temperature higher than that of the resistance material to be coated, a cooling wire of a material having an evaporation temperature higher than that of the resistance material helically wound along a central portion of the filament wire, and a coating of the resistance material covering the filament wire.

16. The apparatus as set forth in claim 13 including means for continuously indicating the amount of coating on the core members.

17. The apparatus as set forth in claim 13 including an indicator member of an electrical insulation material, means for mounting the member between the rims with the plate facing the evaporating filament and electrical connections between the ends of the member and electrical terminals extending through the base member.

18. The apparatus as set forth in claim 13 in which one of the rims is of an electrically conducting material, a rod of electrically conducting material extending from said other rim in alignment with said conducting rod, the ends of said rods being spaced apart, clamps of conducting material on the ends of said rods to support an indicator plate between the rods, a collector ring of conducting material secured to but insulated from said other rim, an electrical connection between the collector ring and the clamp on the insulated rod, a pair of contacts mounted on the base member, one of said contacts engaging said one rim and the other contact engaging the collector ring, and electrical connections between the contacts and terminals extending through the base member.

19. A method of coating cylindrical members by thermal evaporation in a vacuum comprising the steps of enclosing said cylindrical members in an evacuated space, rotating said cylindrical members about an axis in said space, and vaporizing a metal from substantially along said axis for deposition on the surface of said cylindrical members.

20. A method of coating cylindrical members by thermal evaporation in a vacuum comprising the steps of enclosing said cylindrical members in an evacuated space, rotating said cylindrical members in said space about an axis, rotating said cylindrical members about their individual axis in a direction opposite to said first-mentioned direction of rotation, and vaporizing a metal from substantially along said first-mentioned axis for deposition on the surfaces of said cylindrical members.

21. A method of coating cylindrical members by thermal evaporation in a vacuum comprising the steps of enclosing said cylindrical members in an evacuated space, rotating said cylindrical members in said space about an axis, rotating said cylindrical members about their individual axis in a direction opposite to said first-mentioned direction of rotation and at an angular speed substantially the same as said members rotate about said first-mentioned axis, and vaporizing a metal from substantially along said first-mentioned axis for deposition on the surfaces of said cylindrical members.

22. Apparatus for use in coating cylindrical members by thermal evaporation in a vacuum comprising in combination, a rotatable support, means for rotatably mounting said cylindrical members on said support a substantially equal distance from and parallel to the axis of said support, a coated filament, means for mounting said coated filament substantially parallel to the axis of said support and substantially co-extensive with said members, and means for heating said filament to evaporate the coating therefrom.

23. A method of coating cylindrical members by thermal evaporation in a vacuum comprising the steps of enclosing said cylindrical members in an evacuated space, rotating said cylindrical members about an axis in said space, and evaporizing a metal from along a line substantially parallel to said axis and substantially co-extensive with said members for deposition on the surface of said cylindrical members.

References Cited in the file of this patent

UNITED STATES PATENTS

| | | |
|---|---|---|
| 625,733 | Barnes | May 30, 1899 |
| 1,913,610 | Ornsteen | June 13, 1933 |
| 2,043,966 | Whiston et al. | June 9, 1936 |
| 2,151,457 | Williams | Mar. 21, 1939 |
| 2,260,471 | McLeod | Oct. 28, 1941 |
| 2,384,500 | Stoll | Sept. 11, 1945 |
| 2,414,406 | Colbert et al. | Jan. 14, 1947 |
| 2,435,931 | Schweitzer | Feb. 10, 1948 |
| 2,522,272 | Johnson et al. | Sept. 12, 1950 |
| 2,532,971 | Van Leer et al. | Dec. 5, 1950 |
| 2,665,659 | Ogle | Jan. 12, 1954 |
| 2,709,663 | McLean et al. | May 31, 1955 |
| 2,716,622 | Foster | Aug. 30, 1955 |
| 2,719,097 | Auwarter | Sept. 27, 1955 |